US012555543B2

(12) United States Patent
Kim et al.

(10) Patent No.: US 12,555,543 B2
(45) Date of Patent: *Feb. 17, 2026

(54) GATE DRIVER AND DISPLAY DEVICE INCLUDING THE SAME

(71) Applicant: Samsung Display Co., Ltd., Yongin-si (KR)

(72) Inventors: Bo Yeon Kim, Yongin-si (KR); Myeong Su Kim, Yongin-si (KR); Sang Hyun Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 117 days.

This patent is subject to a terminal disclaimer.

(21) Appl. No.: 18/141,225

(22) Filed: Apr. 28, 2023

(65) Prior Publication Data

US 2023/0260463 A1  Aug. 17, 2023

Related U.S. Application Data

(63) Continuation of application No. 16/550,262, filed on Aug. 25, 2019, now Pat. No. 11,670,236.

(30) Foreign Application Priority Data

Oct. 8, 2018  (KR) .......................... 10-2018-0119966

(51) Int. Cl.
*G09G 3/32* (2016.01)
*G09G 3/3233* (2016.01)
*G09G 3/3266* (2016.01)

(52) U.S. Cl.
CPC ......... *G09G 3/3266* (2013.01); *G09G 3/3233* (2013.01); *G09G 2310/0213* (2013.01);
(Continued)

(58) Field of Classification Search
CPC ............... G09G 3/3266; G09G 3/3233; G09G 2320/0233; G09G 2310/08;
(Continued)

(56) References Cited

U.S. PATENT DOCUMENTS 5,063,378 A * 11/1991 Roach .................. G09G 3/3677
345/98
5,926,156 A * 7/1999 Katoh .................. G09G 3/3688
345/55

(Continued)

FOREIGN PATENT DOCUMENTS

CN  104637443 A  5/2015
CN  105244005 A  1/2016

(Continued)

OTHER PUBLICATIONS

Extended European Search Report dated Dec. 20, 2019, issued in European Patent Application No. 19202079.0.

(Continued)

*Primary Examiner* — Lunyi Lao
*Assistant Examiner* — Jarurat Suteerawongsa
(74) *Attorney, Agent, or Firm* — CANTOR COLBURN LLP

(57) ABSTRACT

A gate driver includes a first shift register connected to gate lines, and configured to supply a gate signal to the gate lines in response to a first start pulse, and a second shift register connected to the gate lines and sensing control lines, and configured to supply the gate signal and a sensing signal to the gate lines and the sensing control lines in response to a second start pulse, in which the second shift register is configured to supply the second start pulse at different times in sequential frames.

18 Claims, 9 Drawing Sheets

(52) U.S. Cl.
CPC . *G09G 2310/0286* (2013.01); *G09G 2310/08* (2013.01); *G09G 2320/0233* (2013.01)

(58) Field of Classification Search
CPC ... G09G 2310/0213; G09G 2310/0286; G09G 2320/0693; G09G 2310/0202; G09G 2320/0295; G09G 3/3225; G09G 2320/029; G09G 3/32; G09G 3/3677; G09G 3/20; G09G 2354/00; G02F 1/13338; G02F 1/133514; G06F 3/0412; G06F 3/04164; G06F 3/04166; G06F 3/0446; G06F 3/0445; G11C 19/28; G11C 19/287

See application file for complete search history.

(56) References Cited

U.S. PATENT DOCUMENTS

| | | | |
|---|---|---|---|
| 9,152,251 B2 * | 10/2015 | Jin | G09G 3/3266 |
| 9,437,167 B2 | 9/2016 | Shin et al. | |
| 9,870,090 B2 | 1/2018 | Sun | |
| 10,170,055 B2 | 1/2019 | Kimura et al. | |
| 10,593,268 B2 | 3/2020 | An et al. | |
| 10,770,007 B2 | 9/2020 | Kim et al. | |
| 11,107,420 B2 | 8/2021 | Hong et al. | |
| 2007/0075954 A1 | 4/2007 | Oh et al. | |
| 2007/0164972 A1 * | 7/2007 | Chang | G09G 3/3677 345/100 |
| 2008/0246739 A1 * | 10/2008 | Choi | G11C 19/184 345/206 |
| 2010/0001941 A1 * | 1/2010 | Shin | G09G 3/3677 345/98 |
| 2010/0158187 A1 | 6/2010 | Moon et al. | |
| 2014/0152633 A1 | 6/2014 | Park et al. | |
| 2014/0176401 A1 | 6/2014 | Kim et al. | |
| 2016/0012798 A1 * | 1/2016 | Oh | G09G 3/3283 345/82 |
| 2016/0117963 A1 | 4/2016 | Chung | |
| 2017/0084237 A1 | 3/2017 | Kang | |
| 2017/0147127 A1 * | 5/2017 | Sun | G06F 3/04166 |
| 2017/0206833 A1 | 7/2017 | Lee et al. | |
| 2018/0025695 A1 * | 1/2018 | Han | G09G 3/3677 345/213 |
| 2018/0130423 A1 | 5/2018 | Kim et al. | |
| 2018/0137825 A1 | 5/2018 | An et al. | |
| 2018/0151124 A1 | 5/2018 | An et al. | |
| 2018/0182748 A1 | 6/2018 | Han et al. | |
| 2019/0287444 A1 * | 9/2019 | Tu | G09G 3/20 |

FOREIGN PATENT DOCUMENTS

| | | |
|---|---|---|
| CN | 106128384 A | 11/2016 |
| CN | 108074528 A | 5/2018 |
| EP | 3324393 | 5/2018 |
| KR | 10-2016-0037105 | 4/2016 |
| KR | 10-2017-0034970 | 3/2017 |
| KR | 10-2017-0078978 | 7/2017 |
| KR | 10-2017-0118467 | 10/2017 |
| KR | 1020180050083 A | 5/2018 |
| KR | 1020180057752 A | 5/2018 |
| KR | 10-2018-0060599 | 6/2018 |

OTHER PUBLICATIONS

Non-Final Office Action mailed Oct. 5, 2021, in U.S. Appl. No. 16/550,262.
Final Office Action mailed Jan. 26, 2022, in U.S. Appl. No. 16/550,262.
Advisory Action mailed May 5, 2022, in U.S. Appl. No. 16/550,262.
Non-Final Office Action mailed Jun. 13, 2022, in U.S. Appl. No. 16/550,262.
Final Office Action mailed Nov. 10, 2022, in U.S. Appl. No. 16/550,262.
Notice of Allowance mailed Feb. 2, 2023, in U.S. Appl. No. 16/550,262.

* cited by examiner

GATE DRIVER AND DISPLAY DEVICE INCLUDING THE SAME

CROSS-REFERENCE TO RELATED APPLICATION

This application is a Continuation of U.S. patent application Ser. No. 16/550,262, filed Aug. 25, 2019, which claims priority from and the benefit of Korean Patent Application No. 10-2018-0119966, filed on Oct. 8, 2018, which are hereby incorporated by reference for all purposes as if fully set forth herein.

BACKGROUND

Field

Exemplary embodiments of the invention relate generally to a gate driver and a display device including the gate driver and more particularly to a gate driver and display including the same capable of sensing electrical characteristics of a pixel circuit in the display.

Discussion of the Background

A display device includes pixels to display an image. A recently developed pixel may be connected to an external compensating circuit to sense electrical characteristics of a thin film transistor (TFT) and an organic light emitting diode (OLED) in the pixel, in addition to performing a display operation.

In general, a gate driver sequentially supplies a gate signal to pixel rows. However, when the pixels sequentially perform a sensing operation in response to the gate signal, a horizontal line phenomenon causing the rows of the pixels to be visible from the outside may occur during the sensing operation.

The above information disclosed in this Background section is only for understanding of the background of the inventive concepts, and, therefore, it may contain information that does not constitute prior art.

SUMMARY

A gate driver constructed according to exemplary embodiments of the invention and a display device including the same are capable of sequentially generating a gate signal and selectively generating a gate signal for a specific pixel row.

A gate driver and a display device including the same according to exemplary embodiments are also capable of generating a gate signal that randomly selects a sensing target pixel row for each frame during a sensing operation.

Additional features of the inventive concepts will be set forth in the description which follows, and in part will be apparent from the description, or may be learned by practice of the inventive concepts.

According to one or more embodiments of the invention, a gate driver includes a first shift register connected to gate lines, and configured to supply a gate signal to the gate lines in response to a first start pulse, and a second shift register connected to the gate lines and sensing control lines, and configured to supply the gate signal and a sensing signal to the gate lines and the sensing control lines in response to a second start pulse, in which the second shift register is configured to supply the second start pulse at different times in sequential frames.

The gate driver may further include first switches connected between the first shift register and the gate lines, and between the first shift register and the sensing control lines, and second switches connected between the second shift register and the gate lines, and between the second shift register and the sensing control lines.

The first switch may be configured to be turned on during display periods, and the second switches may be configured to be turned on during sensing periods between the display periods.

The sensing periods may be a part of vertical blank periods between the display periods.

The first shift register may be configured to sequentially supply the gate signal to the gate lines during the display periods in response to the first start pulse.

The second shift register may be configured to carry the second start pulse between a plurality of stages, during the display periods, and output the gate signal and the sensing signal through a kth gate line and a kth sensing control line via a kth stage (k is a natural number), to which the second start pulse has been carried, during the sensing periods.

The second shift register may be configured to finish carrying the second start pulse by a reset signal supplied at start times of the sensing periods.

The plurality of stages may be configured to shift the second start pulse to output the second start pulse at a next stage in response to a second clock signal supplied from an outside.

The supply of the second clock signal may be configured to be stopped during the vertical blank periods.

The second shift register may be configured to finish carrying the second start pulse during the vertical blank periods when the supply of the second clock signal is stopped.

The second shift register may be configured to output the gate signal during periods corresponding to a first out enable signal, and output the sensing signal during periods corresponding to a second out enable signal.

The first shift register may be further configured to supply the sensing signal to the sensing control lines in response to the first start pulse.

The first shift register may include a first-sub shift register configured to supply the gate signal, and a second-sub shift register configured to supply the sensing signal, and the second shift register may include a third-sub shift register configured to supply the gate signal, and a fourth-sub shift register configured to supply the sensing signal.

The second shift register may be configured to supply the second start pulse multiple times within one frame.

According to one or more embodiments of the invention, a display device includes a display panel including a plurality of pixels, a gate driver including a first shift register connected to gate lines, and configured to supply a gate signal to the gate lines in response to a first start pulse, a second shift register connected to the gate lines and sensing control lines, and configured to supply the gate signal and a sensing signal to the gate lines and the sensing control lines in response to a second start pulse, and a timing controller configured to supply the first start pulse and the second start pulse to the gate driver, in which the second shift register is configured to supply the second start pulse at different times in sequential frames.

The gate driver may further include first switches connected between the first shift register and the gate lines, and between the first shift register and the sensing control lines, and second switches connected between the second shift register and the gate lines, and between the second shift register and the sensing control lines.

The timing controller may be configured to supply a mode setting signal to the gate driver for turning on the first switches during display periods, and turning on the second switches during sensing periods between the display periods.

The first shift register may be configured to sequentially supply the gate signal to the gate lines during the display periods in response to the first start pulse.

The second shift register may be configured to carry the second start pulse between a plurality of stages, during the display periods, and output the gate signal and the sensing signal through a kth gate line and a kth sensing control line via a kth stage (k is a natural number), to which the second start pulse has been carried, during the sensing periods.

The timing controller may be configured to supply a reset signal to the second shift register at start times of the sensing periods, and the second shift register may be configured to finish carrying the second start pulse by the reset signal.

The timing controller may be configured to supply a first clock signal to the first shift register, and supply a second clock signal to the second shift register.

The plurality of stages may be configured to shift the second start pulse to output the second start pulse at a next stage in response to the second clock signal.

The supply of the second clock signal may be configured to be stopped during vertical blank periods.

The second shift register may be configured to finish carrying the second start pulse during the vertical blank periods when the supply of the second clock signal is stopped.

The timing controller may be configured to supply a first out enable signal and a second out enable signal to the second shift register during the sensing periods, and the second shift register is configured to output the gate signal during periods corresponding to the first out enable signal, and output the sensing signal during periods corresponding to the second out enable signal.

The first shift register may include a first-sub shift register configured to supply the gate signal, and a second-sub shift register configured to supply the sensing signal to the sensing control lines in response to the first start pulse, and the second shift register may include a third-sub shift register configured to supply the gate signal, and a fourth-sub shift register configured to supply the sensing signal.

The second start pulse may be configured to be supplied multiple times within one frame.

According to one or more embodiments of the invention, a method of preventing a row of pixels from being seen by a user during a sensing operation thereof in a display device having a plurality of rows of pixels connected to gate lines and sensing control lines, and to a gate driver, the method including sequentially applying a gate signal to the gate lines from the gate driver during a display period, and randomly selecting a first row of pixels to sense pixel characteristics thereof after the display period.

The step of sequentially applying a gate signal to the gate lines from the gate driver during a display period may include applying the gate signal in response to a first signal, and the step of randomly selecting the first row of pixels may include selecting the row based upon a second signal generating independently of the first signal The gate driver may include a first shift register and a second shift register, the first and second signal may include first and second start pulses, respectively, and the step of randomly selecting the first row of pixels may include carrying the second start pulse between a plurality of stages of the second shift register during the display period in accordance with a clock signal until occurrence of a first event for starting a sensing period subsequent to the display period, and selecting the first stage to which the second start pulse has been carried at the time of occurrence of the first event, output the gate signal and a sensing signal to a first row of pixels connected to a second stage next to the first stage to sense pixel characteristics of the first row of pixels The second shift register may not be not connected to the gate lines and sensing control lines during the display period.

The timing of supplying the second start pulse within one frame may be selected at random.

The first event may include receiving a reset signal in accordance with the clock signal.

The first event may include stop receiving the clock signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
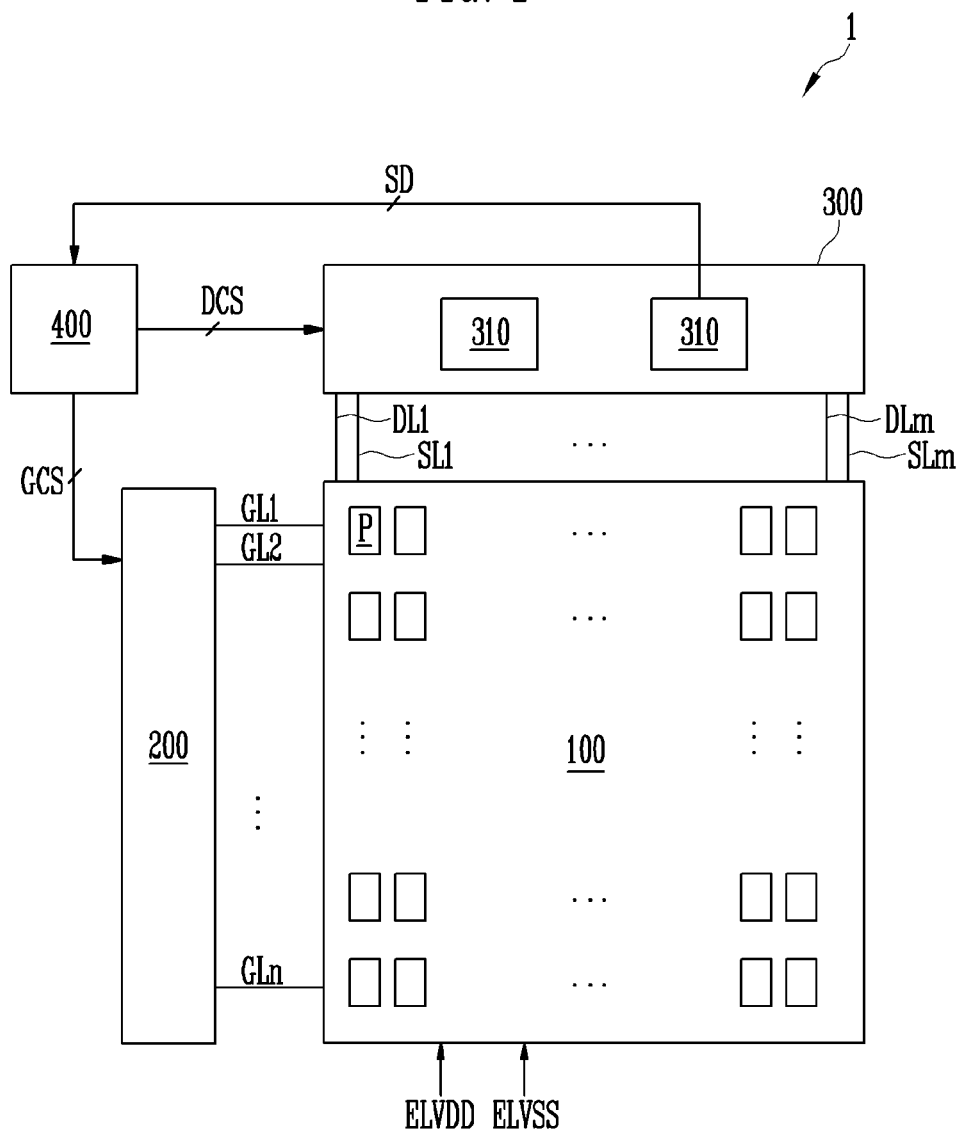
FIG. 1 is a schematic plan view of a display device according to an exemplary embodiment of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, a light emitting element, a pixel structure including the light emitting element, and a manufacturing method thereof according to exemplary embodiments of the invention will be described with reference to illustrated drawings.

FIG. 1 is a schematic plan view of a display device according to an exemplary embodiment of the invention.

Referring to FIG. 1, a display device 1 according to an exemplary embodiment may include a display panel 100, a gate driver 200, a data driver 300, and a timing controller 400.

The display device 1 may be implemented as an organic light emitting display device, a quantum dot display device, or the like. The inventive concepts are not limited to a particular type or configuration of display device, however. For example, the display device 1 may be a flat display device, a flexible display device, a curved display device, a foldable display device, and a bendable display device, or the like. Further, the display device 1 may be applied to a transparent display device, a head-mounted display device, a wearable display device, or the like.

The timing controller 400 may generate a data drive control signal (DCS) and a gate drive control signal (GCS) in response to synchronous signals supplied from an external device. The data drive control signal (DCS) generated by the timing controller 400 may be supplied to the data driver 300, and the gate drive control signal GCS may be supplied to the gate driver 200.

The data drive control signal (DCS) may include a source start signal and clock signals. The source start signal may control a data sampling start time. The clock signals may be used to control a sampling operation.

The gate drive control signal (GCS) may include a gate start signal and clock signals. The gate start signal may control the first timing of a gate signal. The clock signals may be used to shift the gate start signal.

The gate driver 200 may receive the gate drive control signal (GCS) from the timing controller 400. The gate driver 200 supplied with the gate drive control signal (GCS) supplies the gate signal to gate lines GL1 to GLn (n is a natural number). For example, the gate driver 200 may sequentially supply the gate signal to the gate lines GL1 to GLn. When the gate signal is sequentially supplied to the gate lines GL1 to GLn, pixels P may be selected on a horizontal line (or row) basis. To this end, the gate signal may be set as a gate-on voltage (e.g., logic high level) to turn on transistors included in the pixels P.

As used herein, a "gate-on voltage" may refer to a voltage for turning on the transistor to which the gate-on voltage is supplied, rather than one fixed voltage value. As such, values of gate-on voltages of predetermined input signals may be equal to or different from values of gate-on voltages charged into a predetermined node.

The gate driver 200 may be mounted on a non-display area of the display device 1 in the form of an Amorphous Silicon TFT Gate driver circuit (ASG) or an Oxide Semiconductor TFT Gate driver circuit (OSG).

The data driver 300 may be supplied with the data drive control signal (DCS) from the timing controller 400. The data driver 300 supplied with the data drive control signal (DCS) may supply a data signal to data lines DL1 to DLm (m is a natural number). The data signal supplied to the data lines DL1 to DLm may be supplied to the pixels P selected by the gate signal. To this end, the data driver 300 may supply the data signal to the data lines DL1 to DLm to synchronize with the gate signal.

The display panel 100 includes pixels P connected to the gate lines GL1 to GLn and the data lines DL1 to DLm. The display panel 100 may be supplied with first drive power ELVDD and second drive power ELVSS from the outside.

The pixels P of the display panel 100 may be further connected to the data driver 300 through sensing lines SL1-SLm. The data driver 300 may supply a sensing current or sensing voltage through the sensing lines SL1-SLm during a sensing period for sensing the electrical characteristics of a drive transistor and/or an organic light emitting diode provided on the pixels P. According to an exemplary embodiment, the transistors included in the display device 1 may be an n-type oxide thin film transistor. For example, the oxide thin film transistor may be a low temperature polycrystalline oxide (LTPO) thin film transistor, without being limited thereto. In particular, an active pattern (semiconductor layer) included in the transistors may include an inorganic semiconductor (e.g., amorphous silicon, poly silicon) or an organic semiconductor.

Figure 2:
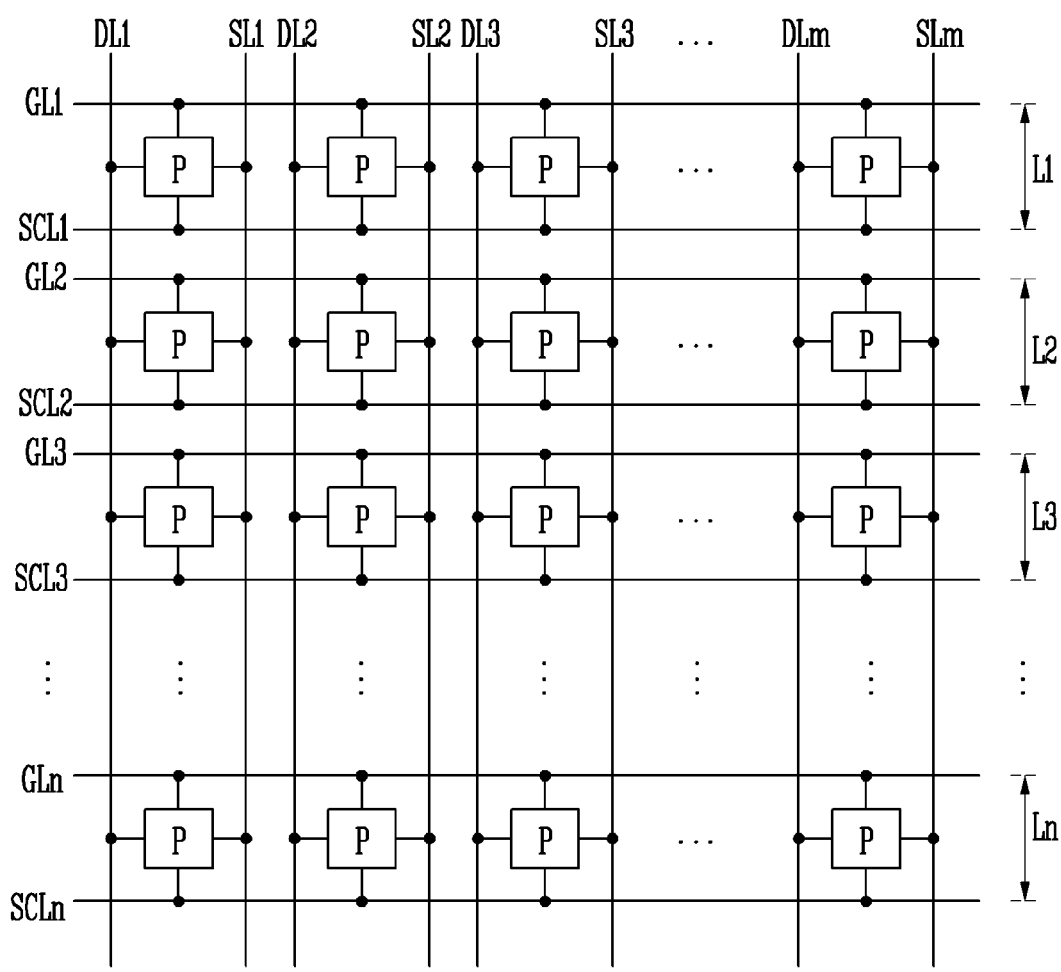
FIG. 2 is a schematic view of a pixel array connected to a gate driver according to an exemplary embodiment of the invention.
Figure 3:
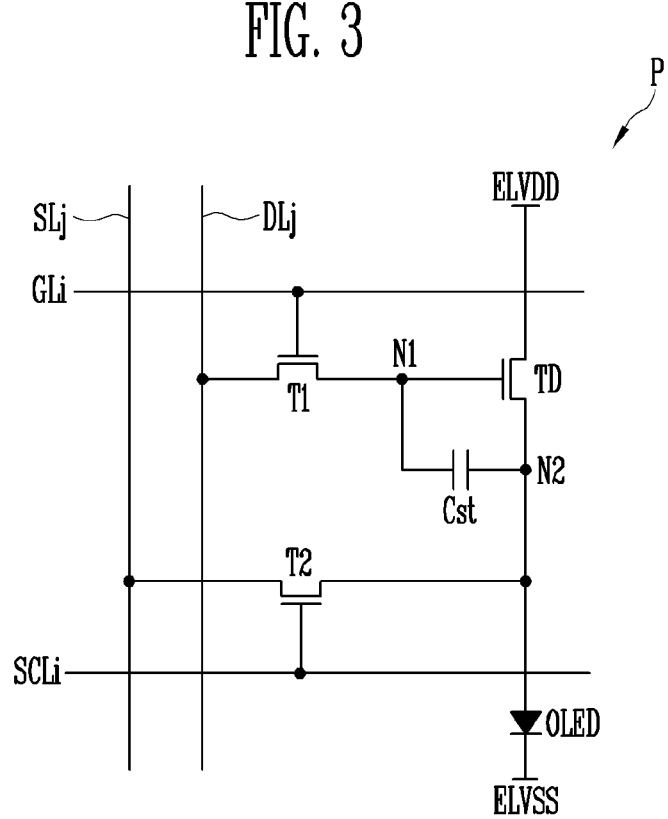
FIG. 3 is a circuit diagram of a representative pixel of the pixel array of FIG. 2 according to an exemplary embodiment.

FIG. 2 is a schematic view of a pixel array connected to a gate driver according to an exemplary embodiment of the invention, and FIG. 3 is a circuit diagram of a representative pixel of the pixel array of FIG. 2 according to an exemplary embodiment. FIG. 3 illustrates a pixel P connected to a $j^{th}$ data line DLj, a $j^{th}$ sensing line SLj, an $i^{th}$ gate line GLi, and an $i^{th}$ sensing control line SCLi, as an example.

Referring to FIG. 2, the pixel array according to an exemplary embodiment includes a plurality of pixel rows L1 to Ln including the pixels P.

In each of the respective pixel rows L1 to Ln, horizontally neighboring pixels P are connected to different data lines DL1 to DLm and different sensing lines SL1 to SLm, respectively. The pixels P forming the respective pixel rows L1 to Ln may be connected to a first gate line to an $n^{th}$ gate line GL1 to GLn. Further, the pixels P forming the respective pixel rows L1 to Ln may be connected to a first sensing control line to an $n^{th}$ sensing control line SCL1 to SCLn.

Referring to FIG. 3, each of the pixels P may include an organic light emitting diode OLED, a drive transistor TD, a storage capacitor Cst, a first switching transistor T1, and a second transistor T2.

The organic light emitting diode OLED may include an anode electrode connected to a first node N1, which is the gate electrode of the drive transistor TD, and a cathode electrode connected to a second node N2 that is an input terminal of the second power supply voltage ELVSS (e.g., low-potential drive voltage).

The drive transistor TD controls a current amount provided to the organic light emitting diode OLED according to a gate-source voltage (Vgs) determined by a voltage charged into the storage capacitor Cst. The drive transistor TD may include the gate electrode connected to the first node N1, a first electrode connected to an input terminal of the first power supply voltage ELVDD (e.g., high-potential drive voltage), and a second electrode connected to the second node N2. In particular, the first electrode may be a drain electrode and the second electrode may be a source electrode.

The storage capacitor Cst is connected between the first node N1 and the second node N2. When the switching transistor T1 is turned on, the storage capacitor Cst may store a voltage difference between the first node N1 and the second node N2 of the drive transistor TD.

The first switching transistor T1 may be connected between the data line DLj and the gate electrode of the drive transistor TD. The gate electrode of the first switching transistor T1 may be connected to the gate line GLi. The first switching transistor T1 is turned on by the gate signal supplied through the gate line GLi, and thus, applying a data signal for displaying an image or a data voltage for sensing supplied through the data line DLj to the first node N1.

The second switching transistor T2 may be connected between the sensing line SLj and the second node N2. The gate electrode of the second switching transistor T2 may be connected to the sensing control line SCLj. The second switching transistor T2 responds to a sensing signal supplied through the sensing control line SCLj, and thus, applying a sensing current and/or a sensing voltage to the second node N2.

Figure 4:
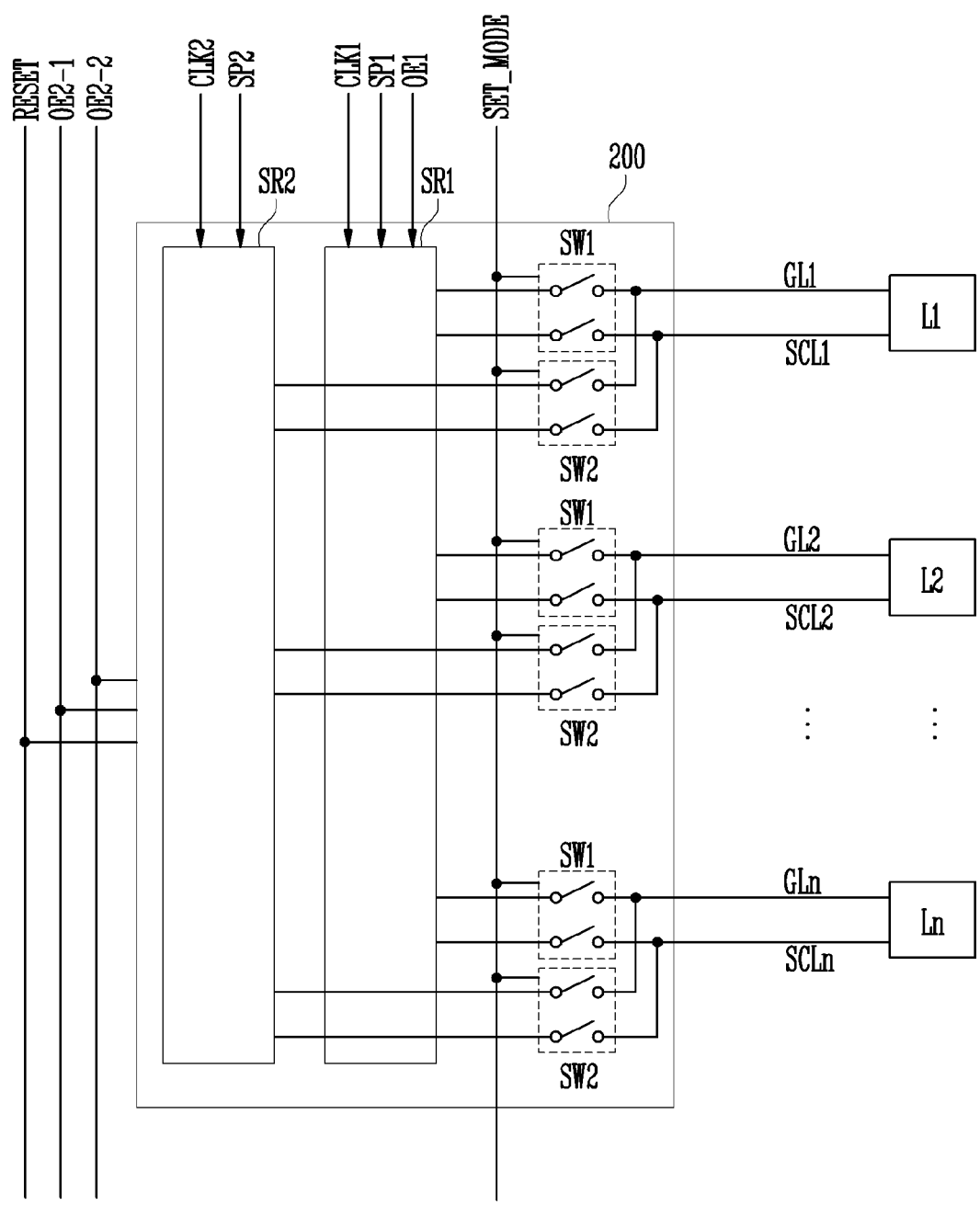
FIG. 4 is a schematic view of a first exemplary embodiment of a gate driver for driving the pixel array of FIG. 2.
Figure 5:
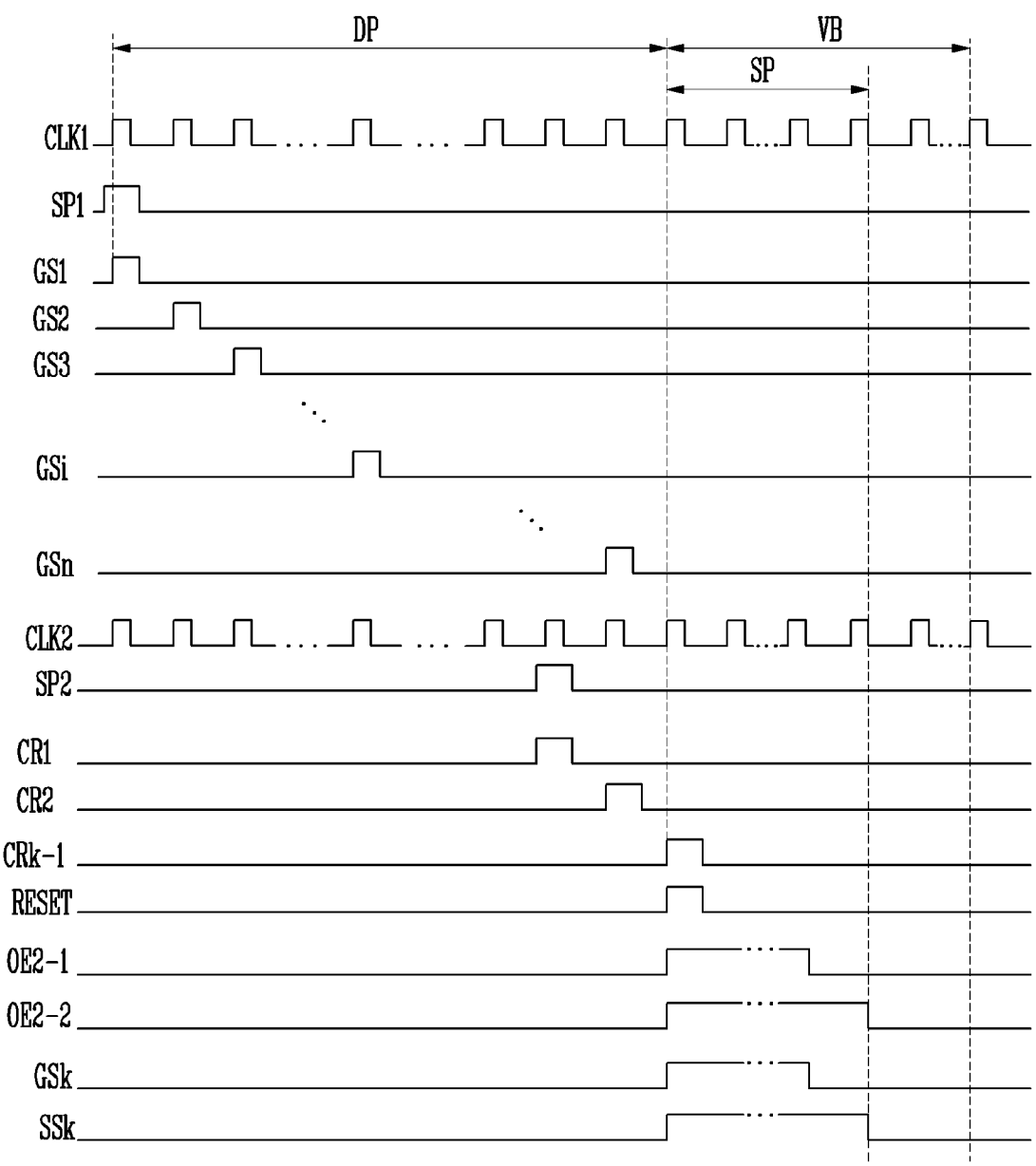
FIG. 5 is a timing diagram showing waveforms of signals to illustrate a first exemplary method of driving a display device.
Figure 6:
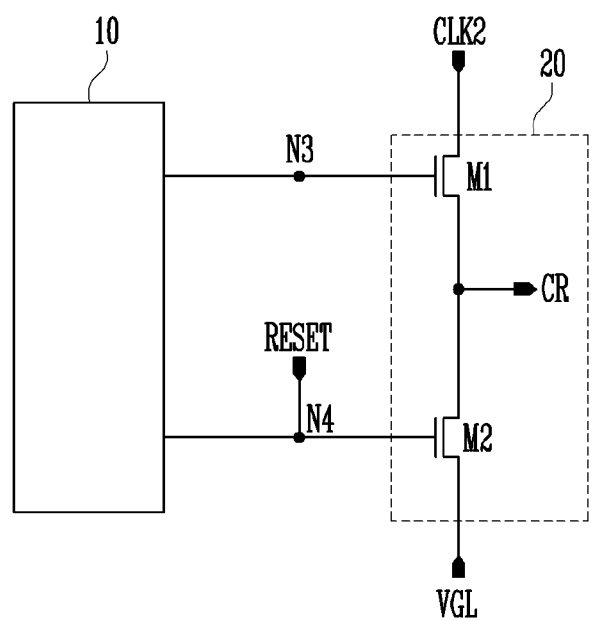
FIG. 6 is a circuit diagram schematically illustrating a part of a stage of the gate driver according to an exemplary embodiment.

FIG. 4 is a schematic view of a first exemplary embodiment of a gate driver for driving the pixel array of FIG. 2, FIG. 5 is a timing diagram showing waveforms of signals to illustrate a first exemplary method of driving a display device, and FIG. 6 is a circuit diagram schematically illustrating a part of a stage of the gate driver according to the first exemplary embodiment.

Referring to FIGS. 4 and 5, the gate driver 200 according to the first exemplary embodiment may include a first shift register SR1 and a second shift register SR2.

The first shift register SR1 is connected to the gate lines GL1 to GLn and the sensing control lines SCL1 to SCLn through first switches SW1. The second shift register SR2 is connected to the gate lines GL1 to GLn and the sensing control lines SCL1 to SCLn through second switches SW2.

The first switches SW1 and the second switches SW2 are opened or closed by a mode setting signal SET_MODE. According to an exemplary embodiment, the first switches SW1 may be closed by the mode setting signal SET_MODE in a display period DP to transmit the gate signals GS1 to GSn and the sensing signals SS1 to SSn output from the first shift register SR1 to pixel rows L1 to Ln. The second switches SW2 may be closed by the mode setting signal SET_MODE in a vertical blank period VB to transmit the gate signals GS1 to GSn and the sensing signals SS1 to SSn output from the second shift register SR2 to the pixel rows L1 to Ln.

The first shift register SR1 and the second shift register SR2 may include a plurality of stages that may shift start pulses SP1 and SP2 to generate the gate signals GS1 to GSn in response to clock signals CLK1 and CLK2. The respective stages may be connected via the gate lines GL1 to GLn to supply the gate signals GS1 to GSn to the respective pixel rows L1 to Ln.

More specifically, the first shift register SR1 may shift the first start pulse SP1 to generate the gate signals GS1 to GSn in response to the first clock signal CLK1. According to an exemplary embodiment, the first shift register SR1 may further generate the sensing signals SS1 to SSn in response to the first clock signal CLK1.

The first clock signal CLK1 may be set as a square-wave signal repeating a logic high level and a logic low level. For example, the logic high level may correspond to a gate-on voltage, and the logic low level may correspond to a gate-off voltage. More particularly, the logic high level may be a voltage value between about 10V and about 30V, and the logic low level may be a voltage value between about −16V and about −3V. Alternatively, for example, the logic high level may be 3V, and the logic low level may be 0V.

The first start pulse SP1 controls the first timing of the gate signals GS1 to GSn. The first start pulse SP1 may be supplied to the first stage of the first shift register SR1. Subsequent stages may be supplied with a carry signal CR (shifted signal of the first start pulse SP1) output from preceding stages.

During the display period DP, the stages of the first shift register SR1 may sequentially supply the gate signals GS1 to GSn to the pixel rows L1 to Ln, which may be generated based on the first clock signal CLK1, the first start pulse SP1, or the carry signal CR. When the first switching transistor T1 of the pixels P disposed on the pixel rows L1 to Ln is turned on by the gate signals GS1 to GSn supplied from the first shift register SR1, the image displaying data signal supplied through the data lines DL1 to DLm may be applied to the drive transistor TD. According to an exemplary embodiment, when the first shift register SR1 further supplies the sensing signals SS1 to SSn to the pixel rows L1 to Ln, the second switching transistor T2 is turned on by the sensing signals SS1 to SSn so that any preset voltage may be supplied to the second node N2 for displaying the image.

According to an exemplary embodiment, the first shift register SR1 may supply the gate signals GS1 to GSn during a period defined in a first out enable signal OE1 within a display period DP. For example, the first out enable signal OE1 may include a first pulse that controls a rising time of the gate signals GS1 to GSn, and a second pulse that controls a falling time of the gate signals GS1 to GSn. In this case, the rising time of the gate signals GS1 to GSn may be synchronized with a rising edge or a falling edge of the first pulse, and the falling time of the gate signals GS1 to GSn may be synchronized with the rising edge or the falling edge of the second pulse.

The second shift register SR2 may shift the second start pulse SP2 to generate the gate signals GS1 to GSn in response to the second clock signal CLK2. Furthermore, the second shift register SR2 may shift the second start pulse SP2 to generate the sensing signals SS1 to SSn in response to the second clock signal CLK2.

The second clock signal CLK2 may be set as a square-wave signal repeating a logic high level and a logic low level. For example, the logic high level may correspond to a gate-on voltage, and the logic low level may correspond to a gate-off voltage. More particularly, the logic high level may be a voltage value between about 10V and about 30V, and the logic low level may be a voltage value between about −16V and about −3V. Alternatively, for example, the logic high level may be 3V, and the logic low level may be 0V.

In some exemplary embodiments, the second clock signal CLK2 may be synchronized with the first clock signal CLK1, and may have substantially the same waveform as the first clock signal CLK1. In some exemplary embodiments, the first clock signal CLK1 and the second clock signal CLK2 may be output from the same source.

The second start pulse SP2 controls the first timing of the sensing signal SS1 to SSn. The second start pulse SP2 may be supplied to the first stage of the second shift register SR2. Subsequent stages may be supplied with a carry signal CR (shifted signal of the second start pulse SP2) output from preceding stages. According to an exemplary embodiment, the second start pulse SP2 may be delayed by one or more cycles as compared to the first start pulse SP1.

The stages of the second shift register SR2 carry the second start pulse SP2 based on the second clock signal CKL2 during the display period DP. The timing for supplying the second start pulse SP2 within the display period DP may be selected at random. Furthermore, according to an exemplary embodiment, the second start pulse SP2 may be supplied to the second shift register SR2 multiple times during the display period DP.

During the display period DP, the second shift register SR2 may generate the gate signals GS1 to GSn and the sensing signals SS1 to SSn based on the second clock signal CKL2, the second start pulse SP2, or the carry signal CR. However, when the second switches SW2 are opened by the mode setting signal SET_MODE during the display period DP, the gate signals GS1 to GSn and the sensing signals SS1 to SSn generated in the second shift register SR2 may not be supplied to the pixel rows L1 to Ln.

Referring to FIG. 5, the second start pulse SP2 carried between the stages of the second shift register SR2 may be carried to any stage, for example, a $k^{th}$ stage at the start time of the vertical blank period VB. The $k^{th}$ stage may supply the gate signal GSk and the sensing signal SSk to the $k^{th}$ pixel row Lk based on the carried second start pulse SP2 and the second clock signal CKL2.

When the first switching transistor T1 of the pixels P provided on the $k^{th}$ pixel row Lk is turned on by the gate signal GSk supplied from the second shift register SR2, the sensing data signal supplied through the data line Dk may be applied to the drive transistor TD. Further, when the second switching transistor T2 of the pixels P provided on the $k^{th}$ pixel row Lk is turned on by the sensing signal SSk supplied from the second shift register SR2, the sensing voltage and/or the sensing current supplied through the sensing line SLk may be applied to the second node N2.

In an exemplary embodiments, a $k^{th}$ stage of the second shift register SR2 may supply the gate signal GSk and the sensing signal SSk during a defined period in a second out enable signal OE2. For example, a 2-1 out enable signal OE2-1 may have a logic high level during the supply period of the gate signal GSk. As another example, the 2-1 out enable signal OE2-1 may have a first pulse that controls the rising time of the gate signal GSk, and a second pulse that controls the falling time of the gate signal GSk. In this case, the rising time of the gate signal GSk is synchronized with the rising edge or the falling edge of the first pulse, and the falling time of the gate signal GSk may be synchronized with the rising edge or the falling edge of the second pulse.

Further, a 2-2 out enable signal OE2-2 may have a logic high level during the supply period of the sensing signal SSk. For example, the 2-2 out enable signal OE2-2 may have a first pulse that controls the rising time of the sensing signal SSk, and a second pulse that controls the falling time of the sensing signal SSk. In this case, the rising time of the sensing signal SSk is synchronized with the rising edge or the falling edge of the first pulse, and the falling time of the sensing signal SSk may be synchronized with the rising edge or the falling edge of the second pulse.

In some exemplary embodiments, the 2-1 out enable signal OE2-1 may be shorter than the 2-2 out enable signal OE2-2. Further, the 2-1 out enable signal OE2-1 may be output multiple times during the sensing period SP.

As such, the pixels P provided on a $k^{th}$ pixel row Lk may be sensed during the sensing period SP when the gate signal GSk and the sensing signal SSk are supplied from the second shift register SR2. The sensing may be performed for the mobility and threshold voltage (Vth) of the drive transistor TD provided on the pixels P, and the electrical characteristics (e.g. deterioration information) of the organic light emitting diode (OLED).

As shown in FIG. 5, the $k^{th}$ stage is selected based on the supply timing of the second start pulse SP2 within the display period DP. When the supply timing of the second start pulse SP2 for each frame is controlled randomly, a sensing target pixel row Lk may be selected randomly for each frame.

According to the first exemplary embodiment, a reset signal RESET may be supplied to a second shift register SR2 at the start time of the vertical blank period VB. Referring to FIG. 6, the reset signal RESET may be supplied to an output buffer 20 provided on stages of the second shift register SR2 at the start time of the vertical blank period VB.

The stages of the second shift register SR2 may include a driver 10 and an output buffer 20, as shown in FIG. 6. The driver 10 controls the voltage of a third node N3 and a fourth node N4 based on the second start pulse SP2 (or carry signal).

The output buffer 20 may output the carry signal CR in response to the voltage of the third node N3 and the fourth node N4 connected with the driver 10. The output buffer may include a first transistor M1 and a second transistor M2.

The first transistor M1 may be connected between a clock terminal, to which a second clock signal CLK2 is applied, and a carry output terminal which outputs the carry signal CR. The first transistor M1 may include the gate electrode connected to the third node N3. The first transistor M1 may supply the gate-on voltage to the carry output terminal in response to the voltage of the third node N3. For example, the first transistor M1 may function as a pull-up buffer.

The second transistor M2 may be connected between a carry output terminal CR and a power supply terminal to which a power supply VGL is applied. The second transistor M2 may include a gate electrode connected to the fourth node N4. The second transistor M2 may supply a gate-off voltage to the carry output terminal in response to the voltage of the fourth node N4. For example, the second transistor M2 may maintain the voltage of the carry output terminal at a gate-off voltage level (e.g., logic low level).

The output buffer 20 may further include a circuit unit to output the gate signal GS and the sensing signal SS.

At the start time of the vertical blank period VB, the reset signal RESET may be supplied to the fourth node N4 of the output buffer 20 provided on the stages of the second shift register SR2. The reset signal RESET may have a gate-on signal to turn on the second transistor M2. In response to the reset signal RESET, the second transistor M2 may be turned on to supply the gate-off voltage to the carry output terminal. That is, the stages of the second shift register SR2 may not output the carry signal to a next stage by the reset signal RESET in the vertical blank period VB. As such, the second start pulse SP2 applied to the $k^{th}$ stage at the start time in the vertical blank period VB may not be carried to a stage subsequent to the $k^{th}$ stage.

In some exemplary embodiments, such a reset signal RESET is provided to remove the clock signals CLK1 and CLK2 remaining in the stages during the vertical blank period VB and then reset the stage of the stages.

Figure 7:
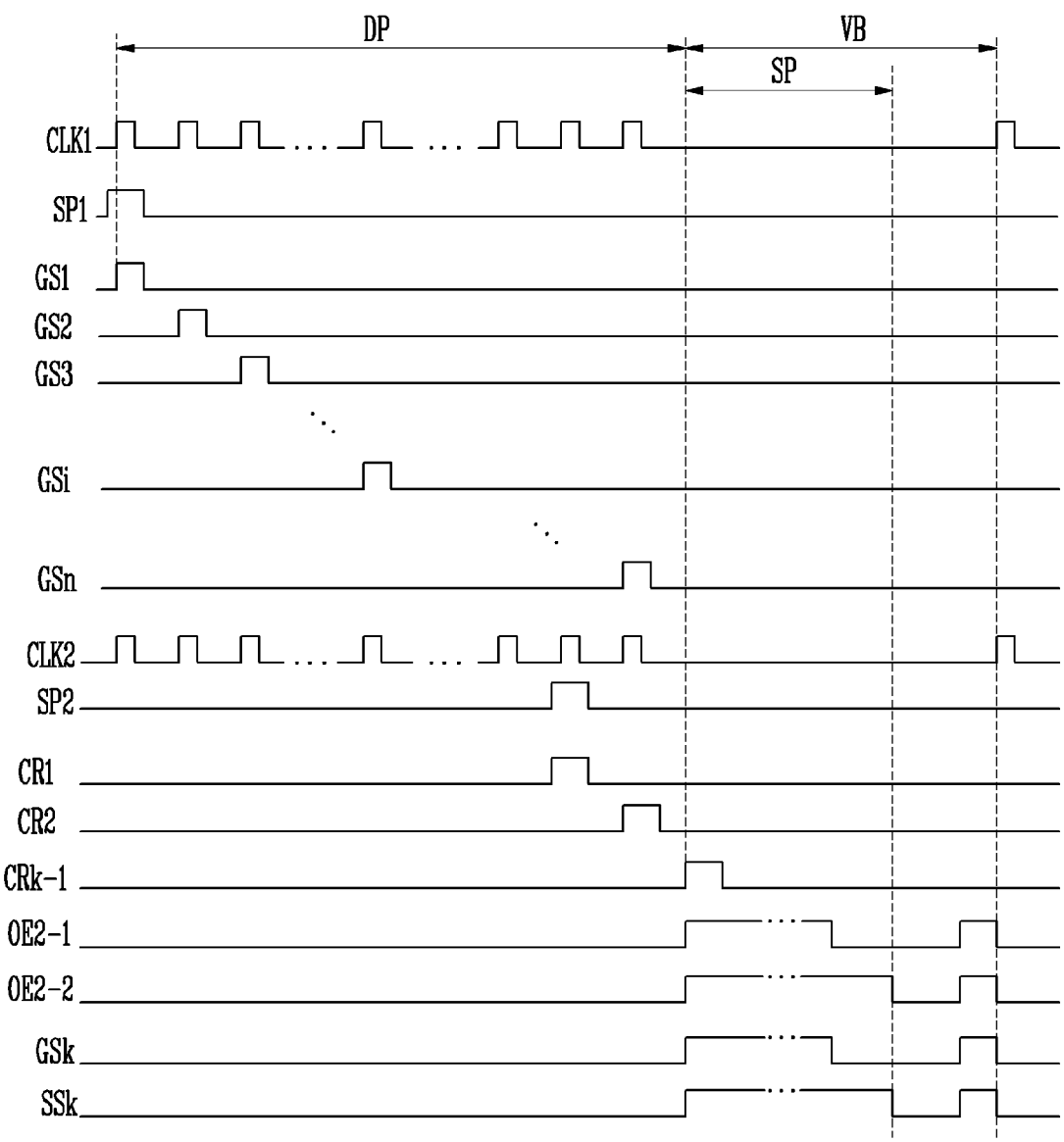
FIG. 7 is a timing diagram showing waveforms of signals to illustrate a second exemplary method of driving a display device.

FIG. 7 is a timing diagram showing waveforms of signals to illustrate a second exemplary method of driving a display device.

Referring to FIG. 7, the gate signals GS1 to GSn and the sensing signals SS1 to SSn may be generated in the second shift register SR2 based on the second clock signal CKL2, the second start pulse SP2, or the carry signal CR during the display period DP. However, when the second switches SW2 are opened by the mode setting signal SET_MODE during the display period DP, the gate signals GS1 to GSn and the sensing signals SS1 to SSn generated in the second shift register SR2 may not be supplied to the pixel rows L1 to Ln.

The second start pulse SP2 carried between the stages of the second shift register SR2 may be carried to any stage, for example, a $k^{th}$ stage at the start time of the vertical blank period VB. The $k^{th}$ stage may supply the gate signal GSk and the sensing signal SSk to the $k^{th}$ pixel row Lk based on the carried second start pulse SP2.

When the first switching transistor T1 of the pixels P provided on the $k^{th}$ pixel row Lk is turned on by the gate signal GSk supplied from the second shift register SR2, the sensing data signal supplied through the data line Dk may be applied to the drive transistor TD. Further, when the second switching transistor T2 of the pixels P provided on the $k^{th}$ pixel row Lk is turned on by the sensing signal SSk supplied from the second shift register SR2, the sensing voltage and/or the sensing current supplied through the sensing line SLk may be applied to the second node N2.

In some exemplary embodiments, a $k^{th}$ stage of the second shift register SR2 may supply the gate signal GSk and the sensing signal SSk during a defined period in a second out enable signal OE2. For example, a 2-1 out enable signal OE2-1 may have a logic high level during the supply period of the gate signal GSk. As another example, the 2-1 out enable signal OE2-1 may have a first pulse that controls the rising time of the gate signal GSk and a second pulse that controls the falling time of the gate signal GSk. In this case, the rising time of the gate signal GSk is synchronized with the rising edge or the falling edge of the first pulse, and the falling time of the gate signal GSk may be synchronized with the rising edge or the falling edge of the second pulse.

Further, a 2-2 out enable signal OE2-2 may have a logic high level during the supply period of the sensing signal SSk. As another example, the 2-2 out enable signal OE2-2 may have a first pulse that controls the rising time of the sensing signal SSk, and a second pulse that controls the falling time of the sensing signal SSk. In this case, the rising time of the sensing signal SSk is synchronized with the rising edge or the falling edge of the first pulse, and the falling time of the sensing signal SSk may be synchronized with the rising edge or the falling edge of the second pulse.

In some exemplary embodiments, the 2-1 out enable signal OE2-1 may be shorter than the 2-2 out enable signal OE2-2. Further, the 2-1 out enable signal OE2-1 may be output multiple times during the sensing period SP.

As such, the pixels P provided on a $k^{th}$ pixel row Lk may be sensed during the sensing period SP when the gate signal GSk and the sensing signal SSk are supplied from the second shift register SR2. The sensing may be performed for the mobility and threshold voltage (Vth) of the drive transistor TD provided on the pixels P, and the electrical characteristics (e.g. deterioration information) of the organic light emitting diode (OLED).

As shown in FIG. 7, the $k^{th}$ stage is selected based on the supply timing of the second start pulse SP2 within the display period DP. When the supply timing of the second start pulse SP2 for each frame is controlled randomly, a sensing target pixel row Lk may be selected randomly for each frame.

Referring to FIG. 7, according to the second exemplary embodiment, the first clock signal CLK1 and the second clock signal CKL2 may not be supplied during the vertical blank period VB, as compared to those of the first exemplary embodiment illustrated with reference to FIG. 5. In this case, since the clock signals CLK1 and CLK2 are not supplied during the vertical blank period VB, the stages of the second shift register SR2 may not generate the carry signal. In this manner, the second start pulse SP2 in the vertical blank period VB is not carried to a stage subsequent to the $k^{th}$ stage. According to the illustrated exemplary embodiment, the reset signal RESET shown in FIG. 5 may not be additionally supplied.

According to the second exemplary embodiment, the second out enable signal OE2 may be further supplied at least once during periods other than the sensing period SP in the vertical blank period VB. As the second out enable signal OE2 is supplied, the gate signal GSK and the sensing signal SSk may be output during a remaining period. An image displaying data signal supplied to an associated pixel in an associated frame may be re-supplied to the data line Dk during the remaining period of the vertical blank period VB. Further, any preset voltage may be supplied to the sensing line SLk during the remaining period of the vertical blank period VB to display the image. Accordingly, the pixels of a $k^{th}$ pixel column maybe reset to a state before the sensing period SP. As such, the sensing operation may not affect the image display of a next frame.

Since FIG. 7 shows signals that are substantially the same as those shown in FIG. 5, repeated descriptions thereof will be omitted to avoid redundancy.

Figure 8:
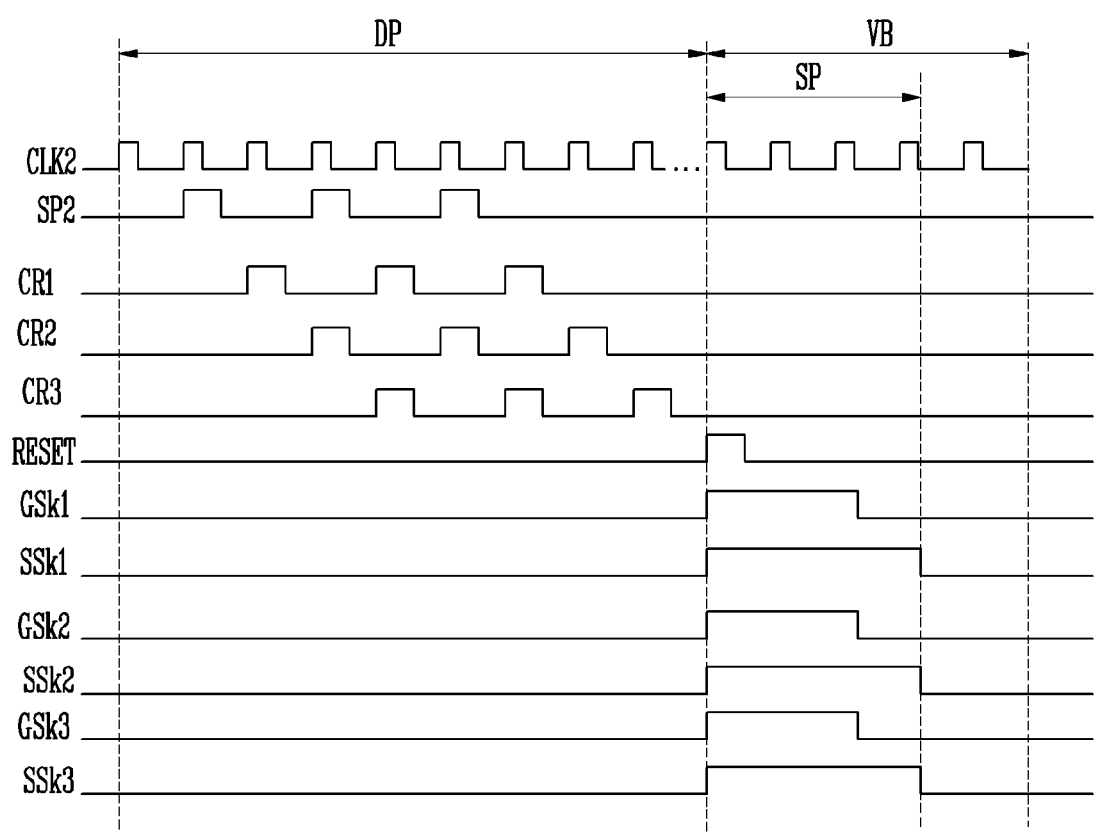
FIG. 8 is a timing diagram showing waveforms of signals to illustrate a third exemplary method of driving a display device.

FIG. 8 is a timing diagram showing waveforms of signals to illustrate a third exemplary method of driving a display device.

Referring to FIG. 8, the second start pulse SP2 may be supplied to the vertical second shift register SR2 multiple times during the display period DP. A plurality of second start pulses SP2 may be supplied to the second shift register SR2 at different times. FIG. 8 illustrates that three second start pulses SP2 are supplied during the display period DP. However, the inventive concepts are not limited to a particular number of second start pulses SP2 supplied during the display period PD.

The plurality of second start pulses SP2 supplied to the second shift register SR2 may be independently carried between the stages of the second shift register SR2. In this case, the plurality of second start pulses SP2 may be carried to a plurality of different stages at the start time of the vertical blank period VB. As such, during the sensing period SP, the sensing operation may be performed for a plurality of pixel rows Lk1, Lk2, and Lk3 that are connected to a plurality of stages, respectively.

As similar to the first exemplary embodiment illustrated with reference to FIG. 5, when the supply timing of the plurality of second start pulses SP2 for each frame is controlled randomly within the display period DP, the plurality of pixel rows that are randomly selected for each frame may be sensed.

Figure 9:
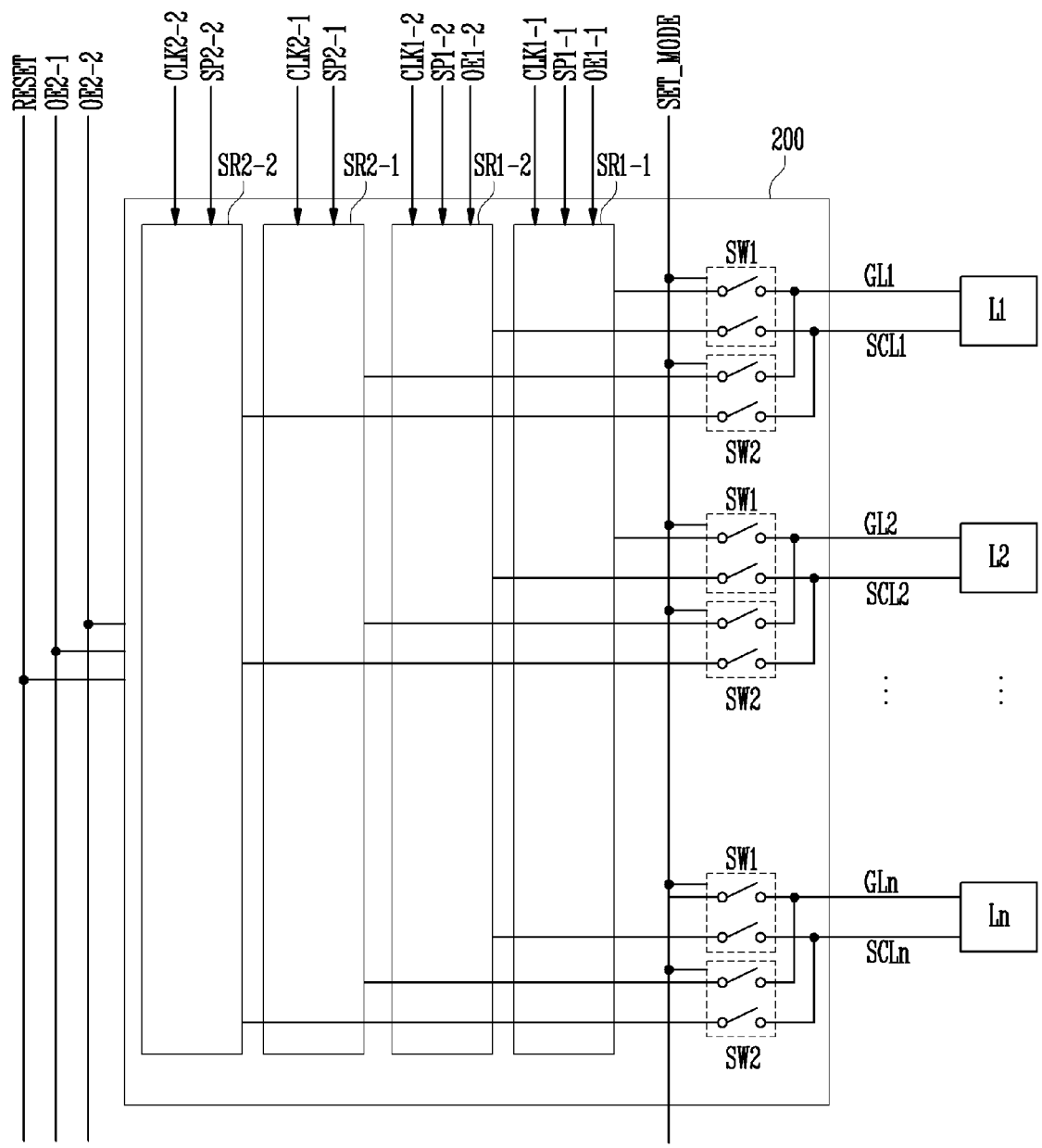
FIG. 9 is a schematic view of a second exemplary embodiment of a gate driver for driving the pixel array of FIG. 2.

FIG. 9 is a schematic view of a second exemplary embodiment of a gate driver for driving the pixel array of FIG. 2.

As compared to the gate driver according to the first exemplary embodiment shown in FIG. 5, each of the first shift register SR1 and the second shift register SR2 includes two sub-shift registers. More particularly, the first shift register SR1 includes a 1-1 shift register SR1-1 and a 1-2 shift register SR1-2, and the second shift register SR2 includes a 2-1 shift register SR2-1 and a 2-2 shift register SR2-2.

In the illustrated exemplary embodiment, the 1-1 shift register SR1-1 is connected to the gate lines GL1 to GLn, and the 1-2 shift register SR1-2 is connected to the sensing control lines SCL1 to SCLn. The 1-1 shift register SR1-1 and the 1-2 shift register SR1-2 may be connected to the gate lines GL1 to GLn and the sensing control lines SCL1 to SCLn through the first switches SW1.

Furthermore, the 2-1 shift register SR2-1 is connected to the gate lines GL1 to GLn, and the 2-2 shift register SR2-2 is connected to the sensing control lines SCL1 to SCLn. The 2-1 shift register SR2-1 and the 2-2 shift register SR2-2 may be connected to the gate lines GL1 to GLn and the sensing control lines SCL1 to SCLn through the second switches SW2.

Since other components shown in FIG. 9 are substantially the same as those shown in FIG. 5, detailed descriptions thereof will be omitted to avoid redundancy.

As described above, exemplary embodiments provide a gate driver and a display device including the gate driver, which are capable of generating a gate signal for only a specific pixel row that is selected at random.

Further, exemplary embodiments provide a gate driver and a display device including the gate driver, which sense and compensate for pixel characteristics using a specific pixel row that is selected at random, thus preventing the occurrence of a horizontal line phenomenon being visible to a user during a sensing operation.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A gate driver comprising:
a first shift register connected to gate lines and sensing control lines, and configured to supply gate signals to the gate lines and sensing signals to the sensing control lines;
a second shift register connected to the gate lines and the sensing control lines, and configured to supply the gate signals to the gate lines and the sensing signals to the sensing control lines;
first switches connected between the first shift register and the gate lines, and between the first shift register and the sensing control lines; and
second switches connected between the second shift register and the gate lines, and between the second shift register and the sensing control lines,
wherein the gate lines are connected to first transistors, and the sensing control lines are connected to second transistors,
wherein the first switches are configured to be turned on via a single mode setting signal having a first logic level during display periods, and the second switches are configured to be turned on via the single mode setting signal having a second logic level during sensing periods between the display periods,
wherein the mode-setting signal is provided on a single signal line to both the first switches and the second switches, and the first and second switches do not simultaneously turned on,
wherein a reset signal is applied to every stage of the second shift register at a start of each sensing period to force all stages except a sensing-target stage to a gate-off level,
wherein each of the first shift register and the second shift register is disposed on a same side from the first switches and the second switches, and
wherein the first switches and the second switches are configured to selectively supply signals from one of the first shift register or the second shift register at a time.

2. The gate driver according to claim 1, wherein at least one of the first switches includes a first-sub switch and a second-sub switch, and at least one of the second switches includes a third-sub switch and a fourth-sub switch,
wherein the first-sub switch is connected between the first shift register and a gate line among the gate lines,
wherein the second-sub switch is connected between the first shift register and a sensing control line among the sensing control lines,
wherein the third-sub switch is connected between the second shift register and the gate line among the gate lines, and is connected to the first-sub switch, and
wherein the fourth-sub switch is connected between the second shift register and the sensing control line among the sensing control lines, and is connected to the second-sub switch.

3. The gate driver according to claim 2, wherein:
the first shift register comprises:
a first-sub shift register connected to the gate lines; and
a second-sub shift register connected to the sensing control lines; and
the second shift register comprises:
a third-sub shift register connected to the gate lines; and
a fourth-sub shift register connected to the sensing control lines,
wherein the first-sub switch is connected between the first-sub shift register and the gate line among the gate lines,
wherein the second-sub switch is connected between the second-sub shift register and the sensing control line among the sensing control lines,
wherein the third-sub switch is connected between the third-sub shift register and the gate line among the gate lines, and
wherein the fourth-sub switch is connected between the fourth-sub shift register and the sensing control line among the sensing control lines.

4. The gate driver according to claim 3, wherein the first-sub switch and the second-sub switch are turned on in response to the mode setting signal in display periods.

5. The gate driver according to claim 4, wherein the third-sub switch and the fourth-sub switch are turned on in response to the mode setting signal in a vertical blank period between the display periods.

6. The gate driver according to claim 1, wherein a start pulse is supplied to the second shift register at different times in sequential frames.

7. The gate driver according to claim 1, wherein the gate driver is one of an Amorphous Silicon TFT Gate driver circuit (ASG) or an Oxide Semiconductor TFT Gate driver circuit (OSG).

8. The gate driver according to claim 1, wherein the reset signal is a pulse synchronized with a vertical blanking interval, and is generated by a timing controller that is external to the second shift register.

9. The gate driver according to claim 1, wherein the second shift register is configured to receive a plurality of second start pulses within a single frame, such that a plurality of different sensing-target stages are sequentially activated during a single sensing period.

10. The gate driver according to claim 1, wherein the first shift register and the second shift register are each implemented as a plurality of cascaded stages, and each stage includes an output buffer that is reset by the reset signal.

11. The gate driver according to claim 1, wherein the first switches and the second switches each comprise thin film transistors formed of different semiconductor materials, such that the first switches are amorphous silicon TFTs and the second switches are oxide semiconductor TFTs.

12. A display device comprising:
a display panel including gate lines, sensing control lines, and pixels connected to the gate lines and the sensing control lines;
a gate driver connected to the gate lines and the sensing control lines; and
a timing controller configured to supply a first start pulse and a second start pulse to the gate driver,
wherein the gate driver comprises:
a first shift register connected to the gate lines and the sensing control lines, and configured to supply gate signals to the gate lines and sensing signals to the sensing control lines in response to the first start pulse;
a second shift register connected to the gate lines and the sensing control lines, and configured to supply the gate signals to the gate lines and the sensing signals to the sensing control lines in response to the second start pulse;
first switches connected between the first shift register and the gate lines, and between the first shift register and the sensing control lines; and
second switches connected between the second shift register and the gate lines, and between the second shift register and the sensing control lines, and
wherein the gate lines are connected to first transistors, and the sensing control lines are connected to second transistors,
wherein the first switches are configured to be turned on via a single mode setting signal having a first logic level during display periods, and the second switches are configured to be turned on via the single mode setting signal having a second logic level during sensing periods between the display periods,
wherein the mode-setting signal is provided on a single signal line to both the first switches and the second switches, and the first and second switches do not simultaneously turned on,
wherein a reset signal is applied to every stage of the second shift register at a start of each sensing period to force all stages except a sensing-target stage to a gate-off level,
wherein the first shift register and the second shift register are disposed on a same side on the display panel,
wherein each of the first shift register and the second shift register is disposed on a same side from the first switches and the second switches, and
wherein the first switches and the second switches are configured to selectively supply signals from one of the first shift register or the second shift register at a time.

13. The display device according to claim 12, wherein the timing controller is configured to output the second start pulse at different times in sequential frames.

14. The display device according to claim 12, wherein the first switches are configured to be turned on during display periods, and the second switches are configured to be turned on during sensing periods between the display periods.

15. The display device according to claim 12, wherein at least one of the pixels comprises:
an organic light emitting diode;
a drive transistor including a gate electrode connected to a first node, a first electrode connected to an input terminal of a first power supply voltage, and a second electrode connected to a second node;
a first transistor among the first transistors, connected between a data line and the gate electrode of the drive transistor, and including a gate electrode connected to a gate line among the gate lines;
a second transistor among the second transistors, connected between a sensing line and the second node, and including a gate electrode connected to a sensing control line among the sensing control lines; and
a storage capacitor connected between the first node and the second node.

16. A method of driving a display device having a plurality of rows of pixels connected to gate lines and sensing control lines, and to a gate driver, the method comprising:
sequentially applying gate signals to the gate lines from the gate driver during display periods; and
selecting a first row of pixels to sense pixel characteristics thereof after the display periods,
wherein the gate driver comprises:
a first shift register connected to the gate lines and the sensing control lines;
a second shift register connected to the gate lines and the sensing control lines;
first switches connected between the first shift register and the gate lines, and between the first shift register and the sensing control lines; and
second switches connected between the second shift register and the gate lines, and between the second shift register and the sensing control lines, and
wherein the gate lines are connected to first transistors, and the sensing control lines are connected to second transistors,
wherein the first switches are configured to be turned on via a single mode setting signal having a first logic level during display periods, and the second switches are configured to be turned on via the mode setting signal having a second logic level during sensing periods between the display periods,
wherein the mode-setting signal is provided on a single signal line to both the first switches and the second switches, and the first and second switches do not simultaneously turned on,
wherein a reset signal is applied to every stage of the second shift register at a start of each sensing period to force all stages except a sensing-target stage to a gate-off level,
wherein the first shift register and the second shift register are disposed on a same side on the display panel,
wherein each of the first shift register and the second shift register is disposed on a same side from the first switches and the second switches, and
wherein the first switches and the second switches are configured to selectively supply signals from one of the first shift register or the second shift register at a time.

17. The method according to claim 16, wherein the first switches are configured to be turned on during the display periods, and the second switches are configured to be turned on during a sensing period between the display periods.

18. The method according to claim 16, wherein:
the step of sequentially applying the gate signals to the gate lines comprises applying the gate signals in response to a first signal; and
the step of selecting the first row of pixels comprises selecting the first row based upon a second signal generated independently of the first signal.

* * * * *